United States Patent [19]
Müller

[11] Patent Number: 5,268,623
[45] Date of Patent: Dec. 7, 1993

[54] D.C. MOTOR WITH A CURRENT-LIMITING ARRANGEMENT

[75] Inventor: Rolf Müller, Schwarzwald, Fed. Rep. of Germany

[73] Assignee: Papst Licensing GmbH, Spaichingen, Fed. Rep. of Germany

[21] Appl. No.: 869,880

[22] Filed: Apr. 17, 1992

Related U.S. Application Data

[63] Continuation of Ser. No. 733,440, Jul. 22, 1991, abandoned, which is a continuation of Ser. No. 472,786, Jan. 31, 1990, abandoned, which is a continuation of Ser. No. 836,392, Mar. 5, 1986, abandoned.

[51] Int. Cl.$^5$ ............................................. H02P 7/06
[52] U.S. Cl. ..................................... 318/434; 318/254
[58] Field of Search ............... 318/138, 254, 439, 432, 318/433, 434

[56] References Cited

U.S. PATENT DOCUMENTS

| | | |
|---|---|---|
| 2,911,579 | 11/1959 | Mueller . |
| 3,177,418 | 4/1965 | Meng . |
| 3,231,808 | 1/1966 | McDaniel . |
| 3,286,151 | 11/1966 | Dinger ............................... 388/817 |
| 3,683,253 | 8/1972 | Rummel et al. . |
| 3,855,511 | 12/1974 | Smith . |
| 3,860,858 | 1/1975 | Nola . |
| 4,085,355 | 4/1978 | Fradella ............................... 318/168 |
| 4,268,782 | 5/1981 | Kawada et al. ..................... 318/434 |
| 4,282,570 | 8/1981 | Kurosawa et al. .................... 363/87 |
| 4,303,874 | 12/1981 | Iwai . |
| 4,477,752 | 10/1984 | Nakano et al. . |
| 4,488,096 | 12/1984 | Cap et al. . |
| 4,490,657 | 12/1984 | Smith ................................... 318/434 |
| 4,507,591 | 3/1985 | Kelleher . |
| 4,527,102 | 7/1985 | Gotou ................................... 318/254 |
| 4,532,567 | 7/1985 | Kade ............................... 318/434 X |
| 4,546,293 | 10/1985 | Peterson et al. ..................... 318/254 |
| 4,574,226 | 3/1986 | Binder ............................... 388/823 X |
| 4,608,619 | 8/1986 | Bomer et al. .................... 318/434 X |
| 4,623,826 | 11/1986 | Benjamin et al. . |
| 4,642,537 | 2/1987 | Young ................................... 318/254 |

FOREIGN PATENT DOCUMENTS

| | | |
|---|---|---|
| 45993 | 12/1968 | Fed. Rep. of Germany . |
| 3044027 | 8/1981 | Fed. Rep. of Germany . |
| 3125157 | 1/1983 | Fed. Rep. of Germany . |

*Primary Examiner*—Bentsu Ro
*Attorney, Agent, or Firm*—Finnegan, Henderson, Farabow, Garrett & Dunner

[57] ABSTRACT

A circuit for controlling a d.c. motor (10) is provided with a current-limiting arrangement (27), designed as a time-delay amplifier, responding at a certain current value by interrupting the supply of current to the motor (10), and then after a certain time, determined e.g. by internal timing elements (46, 47, 49, 54), switching the current supply to the motor (10) on again. The switching operations occurring in such a motor, i.e., the pulse-duration/pulse-gap ratio and the pulse repetition frequency, are a function of the back-EMF that is induced in the motor (10) as a result of its rotation. This situation is exploited for the following purpose: to make the threshold value of the current-limiting arrangement high when the pulse-duration/pulse-gap ratio is high, namely e.g. when the application of current to the motor is practically continuous; and, in contrast thereto, to reduce this threshold value to, for example, one half when the pulse-duration/pulse-gap ratio is low, such as is characteristic when the motor is at a standstill and during start-up. In this way the motor, if blocked against rotation, draws power of a value substantially lower than at rated operation and, for this reason, cannot become overheated even if it is blocked against rotation, and during start-up no excessive values of start-up current can develop.

19 Claims, 5 Drawing Sheets

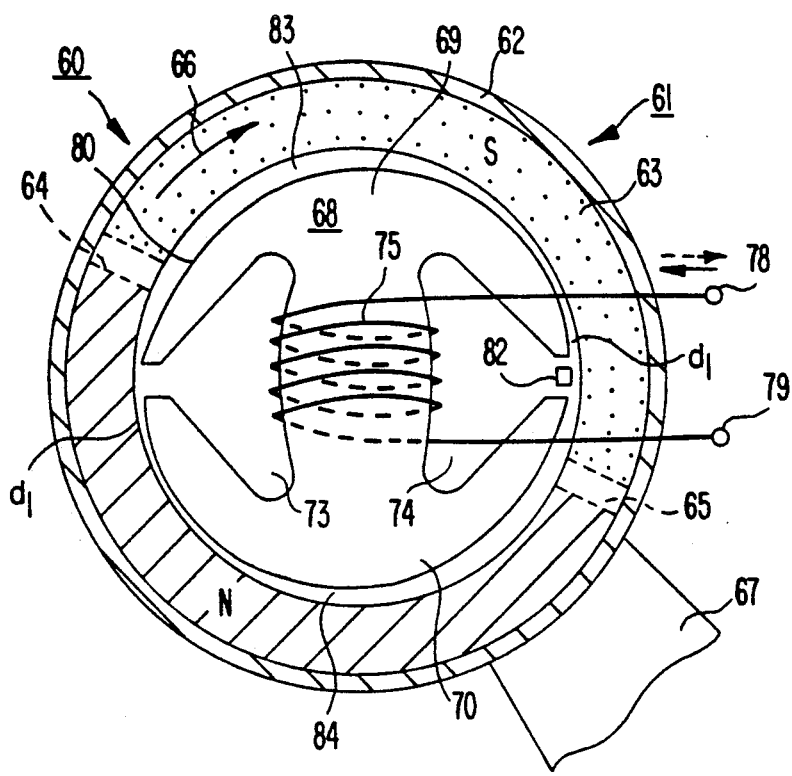
FIG. 2
PRIOR ART
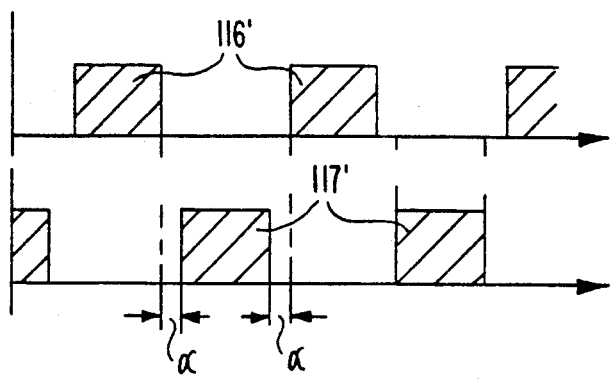
FIG. 3A
FIG. 3B

D.C. MOTOR WITH A CURRENT-LIMITING ARRANGEMENT

This application is a continuation of Ser. No. 07/733,440, filed Jul. 22, 1991, which is a continuation of Ser. No. 07/472,786, filed Jan. 31, 1990, which is a continuation of Ser. No. 06/836,392, filed Mar. 5, 1986, all abandoned.

BACKGROUND OF THE INVENTION

1. Field of the Invention

The invention concerns a circuit for controlling a d.c. motor of the type set forth in the preamble of patent claim 1. A circuit of this type is known from Federal Republic of Germany "Offenlegungsschrift" 3,044,027.

2. Description of the Related Art

In a known circuit, a circuit-limiting arrangement is provided which maintains the maximum current for the motor constant to a great degree over the entire rpm range of the motor. If such a motor is blocked against rotation by any sort of external intervention, then it draws a relatively high current and therefore can become overheated.

SUMMARY OF THE INVENTION

Therefore it is an object of the invention, when such a motor is used, to reduce the current especially when the motor is blocked against rotation.

In accordance with the invention this object is achieved by a circuit for controlling a d.c. motor, including a current-limiting arrangement that interrupts the current to the motor whenever the current reaches a selected maximum value and switches the current back on thereafter, and repeating the switching to provide that the average current over several switching cycles is less than the selected maximum current and is related to a signal indicative of motor speed to provide a direct relationship of the average current over several switching cycles to motor speed.

Further details and advantageous modifications of the invention are disclosed in the exemplary embodiments described below and illustrated in the drawing, which are in no way to be understood as limiting the invention; and are also disclosed in the dependent claims.

BRIEF DESCRIPTION OF THE DRAWING

FIG. 2 is a schematic illustration of a brushless, external-rotor motor of known type, with which the invention can be used, FIG. 3 is a diagram used to explain the manner of operation of FIG. 4.

DETAILED DESCRIPTION OF THE PREFERRED EMBODIMENTS

Figure 1:
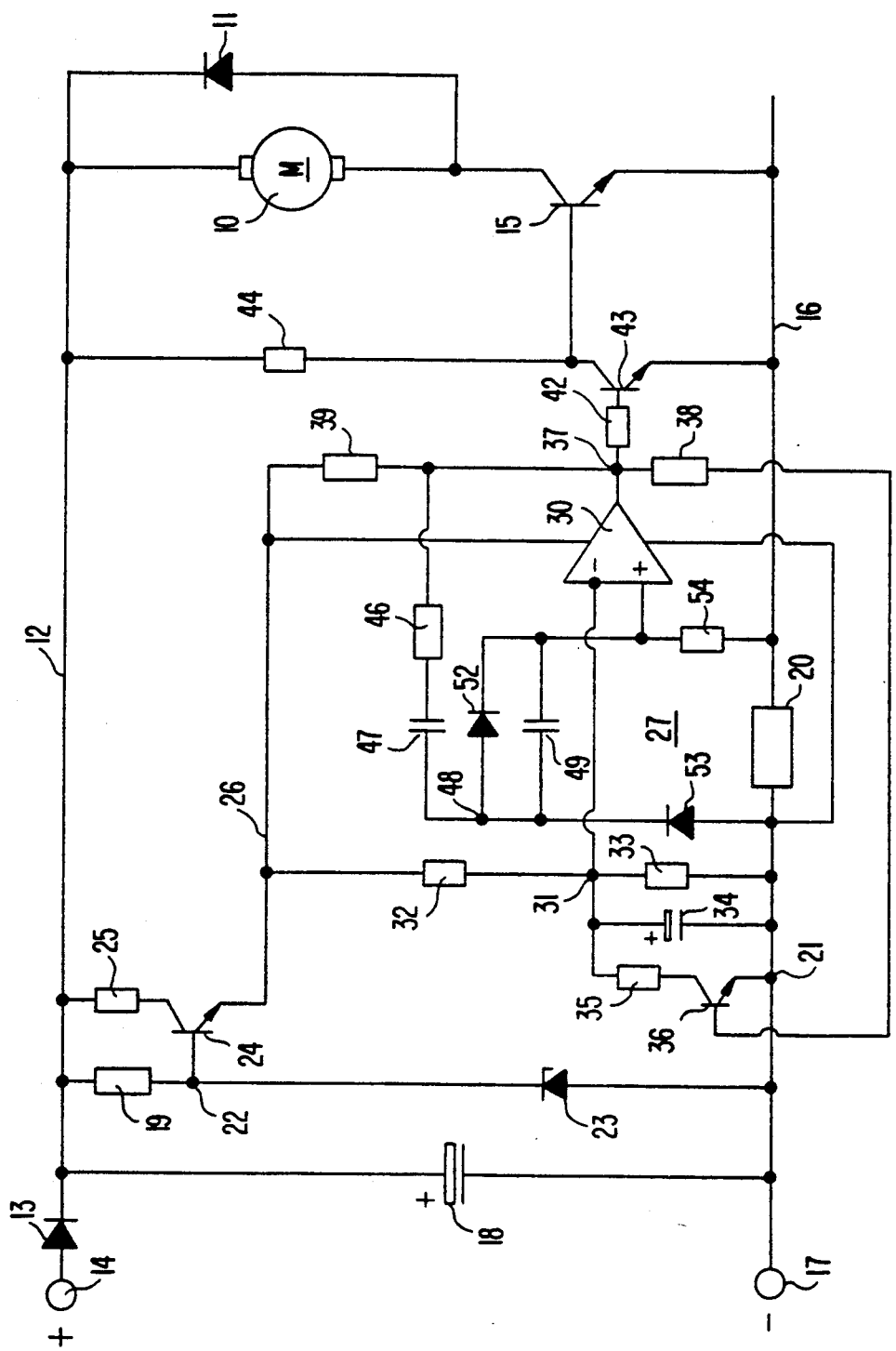
FIG. 1 depicts a first exemplary embodiment of a circuit in accordance with the invention.

FIG. 1 depicts a d.c. motor 10 which can be constructed as a conventional collector-commutated, low- or fractional-horsepower motor, a free-running diode 11, as will be explained hereinafter being connected in parallel thereto. One terminal of the motor 10 is connected to a plus line 12 which leads, via a diode 13 serving to protect against wrong-polarity connection, to a connector terminal 14. The other terminal of the motor 10 is connected to the collector of an npn Darlington transistor 15, the emitter of which is connected to a minus line 16 that leads, through the intermediary of a low-resistance measuring resistor 20 followed by a conductor segment 21, to a connector terminal 17 for the motor arrangement. The terminals 14 and 17 can for example be connected to a 12 or 24 V battery.

A smoothing capacitor 18 is connected between the lines 12 and 21. Also, a resistor 19 extends from the line 12 to a junction 22, from which latter a zener diode 23 extends to the line 21. The junction 22 is connected to the base of an npn transistor 24, whose collector is connected via a resistor 25 to the line 12, and whose emitter leads to a conductor 26, to which latter there is applied during operation a voltage, e.g. of plus 5 V, that is constant relative to the conductor 21. The elements 19-25 thus serve as a constant-voltage stage for the constituent elements of a current-limiting arrangement 27 connected to the conductor 26; the current-limiting arrangement 27 senses the voltage drop across the measuring resistor 20 and, in the event of a certain maximum current corresponding to the voltage drop across resistor 20, renders the Darlington transistor 15 non-conductive, so that the current from the terminals 14, 17 to the motor 10 be interrupted and the current in the motor 10 decay in oscillatory fashion through the free-running diode 11. After a time delay which is implemented by means of a time-constant stage, but which can also be established by the time interval that elapses until the detection of a certain minimum current, the current to the motor 10 is then switched on again, and this sequence of events repeats itself if the predetermined value for the maximum current is again exceeded. The invention addresses the problem of controlling, in an rpm-dependent fashion, the predetermined value for the maximum current, and in such a manner that it be lower at zero rpm and at low rpm's than it is at the rated rpm of the motor 10.

The current-limiting arrangement 27 comprises an operational amplifier 30 which serves as a comparator and is supplied with operating current from the conductors 26 and 21. Its inverting input, marked with the minus sign, is connected to a junction 31, from which a resistor 32 extends to the conductor 26 and a resistor 33 to the line 21. The resistors 32 and 33 accordingly form a voltage divider. A capacitor 34 of a few microfarads is connected in parallel to the resistor 33. Also, a resistor 35 extends from the junction 31 to the collector of an npn transistor 36, whose emitter is connected to the line 21, and whose base is connected via a resistor 38 to the output 37 of the comparator 30. The latter is internally designed in such a manner that its output 37 is internally connected to the line 21 so long as its non-inverting input "+" is at a potential more negative than its inverting input "−". In contrast, in the opposite situation, the output 37 is no longer connected to the line 21 (so-called open-collector circuit). This output 37 is connected via a resistor 39 to the conductor 26, and via a resistor 42 to the base of an npn transistor 43, whose collector is connected via a resistor 44 to the line 12, and whose emitter is connected to the line 16. Thus, if the output 37 of comparator 30 is connected to the line 21, then transistors 36 and 43 are non-conductive, and the transistor 15 receives a base current via the resistor 44, so that current is fed to the motor 10 via the transistor 15. If in the opposite situation the output 37 of comparator 30 is no longer connected to conductor 21, then the transistors 36 and 43 receive a base current via the resistor 39 and are conductive. The transistor 15 is then non-conductive, and the transistor 36 has the effect of connecting the resistor 35 parallel to the resistor 33. Inasmuch as the resistors 35 and 33 are so dimensioned that the resistor 35 is only slightly smaller than the resistor 33, this amounts in a practical sense to a halving of the value of resistor 33 or, expressed differently, a halving of the voltage across the latter, this voltage establishing by means of the measuring resistor 20 the maximum value for the current.

Because, during operation, the comparator 30 is continually undergoing changes of state, and in particular dependent upon the rpm of motor 10 and thus on its back-EMF, the transistor 36, during operation, is continually being rendered conductive and non-conductive, such that the voltage between junction 31 and line 21 would continually fluctuate with the rhythm of these changes. This is avoided by the capacitor 34 which smooths this voltage, so that the d.c. voltage across capacitor 34 is high at normal operating rpm because the transistor 36 is then continuously non-conductive, but in contrast is low in the event that the motor 10 is blocked against rotation because the transistor 36 is then conductive for a large part of the time. During start-up of motor 10, this voltage across capacitor 34 increases approximately continuously, starting from the minimum value when the motor is at a standstill and up to the maximum value at the operating rpm. The value of the maximum current, limited by the current-limiting arrangement 27, is in this manner a function of the rpm of motor 10.

The arrangement of transistor 36, resistors 33 and 35, and capacitor 34, thus operates similarly to a digital-to-analog converter for controlling this value in dependence upon the duty factor of the current pulses and thereby—indirectly—in dependence upon the rpm of motor 10.

The comparator 30 is designed as a so-called time-delay amplifier and for this purpose exhibits a positive-feedback branch containing a capacitance, so that the comparator 30, if it has responded to a too high motor current, can revert to its previous state only after a certain time. The output 37 is for this purpose connected, via the series connection of a resistor 46 and a first capacitor 47, to a junction 48, the latter being connected to the non-inverting input of the comparator 30 via a second capacitor 49. Also, two diodes 52, 53 are provided. The anode of diode 53 is connected to line 21, and its cathode to the junction 48. The cathode of diode 52 is connected directly to the non-inverting input of comparator 30 and is connected, via a resistor 54, to the line 16, whereas its anode is connected to junction 48.

The time-constant of the time-delay amplifier is in principle determined by the resistors 46 and 54 and by capacitor 47. (The resistor 46 chiefly serves to prevent HF oscillations of the comparator 30.) These circuit elements in principle determine the re-charging time of capacitor 47. Inasmuch as, in situations where the motor is blocked against rotation and in situations of low rpm, the time-delay amplifier changes state with a high frequency, there is not available enough time for the capacitor 47 to be re-charged. As a result, with decreasing rpm the motor current would increase, e.g. by 30%, which for the reasons mentioned is not desirable, furthermore all the more so because, as a result, the power transistor 15 could be damaged, especially in the event that the motor 10 is blocked against rotation. By means of the diode 53, however, it is achieved that, during charging of capacitor 47 a delay no longer occurs, inasmuch as the diode 53 then bypasses the resistor 54. In contrast, the diode 53 is non-conductive during discharge of capacitor 47, but the diode 52 becomes conductive, so that the discharge proceeds through resistor 54 and the requisite time-relationship is achieved.

Also, in order to influence in the desired fashion the positive-feedback branch, the second capacitor 49 is provided, having e.g. one-third the capacitance of capacitor 47 and being connected in parallel to the diode 52. This capacitor 49 effects a fast change of state of the time-delay amplifier. If it were to be made equal to the capacitor 47, then the undesirable low-rpm behavior would again result, inasmuch as in such event the charging and discharging operations of the second capacitor 49 would not have been made unsymmetric. Thus, the diodes 52 and 53 prevent the motor current—without transistor 36 and resistor 35—from being limited to higher values when the rpm is dropping.

Some typical values for the components of the FIG. 1 arrangement are given below, wherein k=kOhm and n=nF:

| | |
|---|---|
| diode 13 | type 4001 |
| capacitor 18 | 100 µF |
| resistor 20 | 0.1 Ohm |
| resistor 32 | 100 k |
| resistor 33 | 13 k |
| resistors 35, 38, 42, 46 | 10 k |
| resistors 39, 44 | 1.5 k |
| resistor 46 | 1 k |
| amplifier 30 | LM 393 |
| capacitor 47 | 15 n |
| capacitor 49 | 4.7 n |
| resistor 54 | 3.3 k |
| capacitor 34 | 3 µF |

OPERATION

When the motor, at standstill, is switched on, the back-EMF of the motor 10 is equal to zero, as the motor is not turning. For this reason the motor current rises quickly, so that the current-limiting arrangement 27, after a short switch-on time, responds and interrupts the current with a high repetition frequency and low duty factor. Accordingly, the transistor 36 is, at this high repetition frequency, rendered non-conductive only briefly, e.g. for 10 ms, and then conductive for a relatively long time, e.g. 50 ms, and as a result reduces the voltage across capacitor 34 to about half the value it would have if the transistor 36 were non-continuously conductive. Consequently, the current through measuring resistor 20 is limited to about half the value it has at rated rpm, and since this reduced current—as a result of the continual switching-ON and -OFF of the time-delay amplifier 30—is in each instance being externally applied to the motor only during short time intervals, the application of power to the motor 10 is limited to about one-fourth the power applied at rated rpm, so that if the motor is blocked against rotation no overheating can occur.

If the motor starts up, then it induces a back-EMF that is approximately proportional to its rpm, so that the current in the motor rises less quickly and the switch-ON periods of the time-delay amplifier 30 become longer; i.e., the so-called ON-time/OFF-time ratio or duty cycle (mark to space ratio) decreases, and the transistor 36 is during each cycle of operation non-conductive for a longer time and conductive only during shorter time periods. In correspondence thereto, the voltage across capacitor 34 rises, and the current through resistor 20 becomes limited to a higher value. This is necessary to produce a sufficient start-up torque, for example in the case of an rpm-dependent load such as a fan. At rated rpm, the back-EMF of motor 10 is so high that its current is lower than the maximum permissible current and, for this reason, the current-limiting arrangement 27 ceases to respond; i.e., the two transistors 36 and 43 are in such event continuously non-conductive, and transistor 15 is continuously conductive. The voltage across capacitor 34 in such event has its maximum value, and the current is limited to a value that is, e.g., twice as high as when the rpm is zero or low. In this manner, the threshold value of the current-limiting arrangement is varied in an rpm-dependent manner, and indeed with minimum added cost. The manner in which diodes 52 and 53 function has already been described. They serve the same purpose and support the action of the components 34–36.

Of course, the change in the threshold value for the current-limiting arrangement could also be achieved in different manner. E.g., for the resistor 33 there could be used a potentiometer, with the latter being adjusted by an electrical adjusting element whose output signal is a function of the frequency with which the amplifier 30 changes state. Or else the series connection of a resistor and a transistor could be connected parallel to the resistor 32, such transistor being in that event conductive whenever the transistor 15 is conductive. Even in this situation the smoothing capacitor 34 would have to be used, and can be connected either between junction 31 and line 21 or else between point 31 and conductor 26. Alternatively, even the value of the measuring resistor 20 could be varied in dependence upon the duty factor, but this would require a greater number of components. Thus there are numerous variants within the scope of the present invention, and the illustrated embodiment, although the best embodiment known at present, is, however, certainly not the only one.

Figure 4:
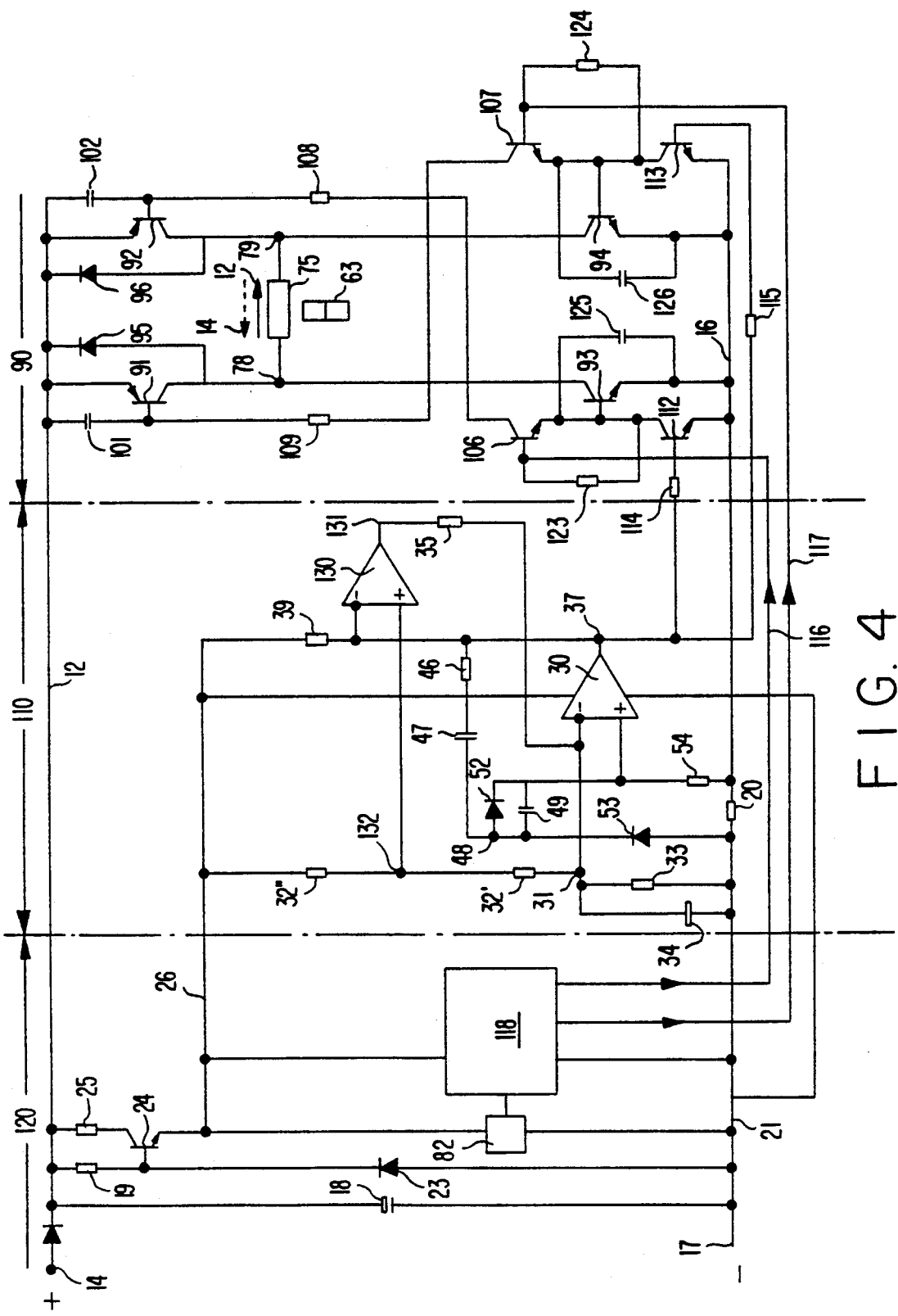
FIG. 4 depicts a second exemplary embodiment of a circuit according to the invention, with which here a brushless d.c. motor is controlled.

FIGS. 2–4 depict the use of the present invention in the case of a brushless d.c. motor. Elements that are the same, or operate the same, as in FIG. 1 are in FIGS. 2–4 denoted by the same reference numerals as there and for the most part are not described a second time. A typical example of such a motor is very schematically shown in FIG. 2. FIG. 2 depicts a two-pole, two-pulse, monofilar brushless d.c. motor.

DEFINITIONS

Two-pulse: refers to the number of current pulses applied to the stator per 360° el. of rotor rotation. E.g., in the case of a two-pulse motor, that is two current pulses per 360° el.

Monofilar: The motor has only a single winding. Such a motor could also be denoted as one-phase.

Two-pole: The rotor has two poles.

Of course, the present invention can be utilized in the same fashion in the case of motors other than those which are two-pulse, and in the case of motors other than those which are monofilar, and in the case of motors other than those which are two-pole, without this being for each such case illustrated using examples.

The motor 60 shown in FIG. 2 is a two-pole, two-pulse, monofilar, external-rotor motor. Its external rotor 61 is radially magnetized, with the two poles being indicated by N and S.

This magnetization has the shape of a trapezoid when its value is plotted versus angular location, with narrow gaps 64 and 65 (ca. 5°–15° el.) between the poles. The trapezoidally shaped magnetization plot produces a practically constant induction over intervals measuring 165°–175° el., each such interval adjoined by a monotonic decrease in magnetization; see the Federal Republic of Germany Pat. 2,346,380 of the present assignee, where this is set forth in detail.

The rotor 61 has a peripheral part 62, e.g. a deep-drawn cup made of steel, whose non-illustrated bottom is connected to the non-illustrated shaft of the rotor. The actual magnet 63 is secured in this cup 62. Fan blades 67 of the fan are welded onto the cup 62, the fan being driven by the motor 60. Only a single blade 67 is depicted.

In FIG. 2 the locations where the induction (=magnetic flux density) is practically constant are schematically indicated by linewise hatching for the north pole and by pointwise hatching for the south pole. The rotation direction is indicated by 66. The stator 68 has two salient poles: an upper pole 69 and a lower pole 70 which form between themselves slots 73 and 74 in which the monofilar winding 75 is arranged, the two terminals of which are denoted by 78 and 79. A rotor position sensor 82 is arranged at the opening of slot 74. It is preferably a galvanometric sensor, e.g. a Hall-IC. A Hall-IC delivers during rotation of rotor 62 an approximately rectangular signal having a duty factor of $m=50\%$; i.e., the pulse duration is approximately equal to the interval between pulses.

The air gap 83 along the stator pole 69, and the identically shaped air gap 84 along the pole 70, are dimensioned in the manner shown in U.S. Pat. No. 4,030,005. E.g., beginning at the slot 73, the air gap 83 increases proceeding in the rotation direction up to a maximum 80 and, from there on, decreases monotonically to a minimum $d_1$. This produces the desired reluctance torque; see the already mentioned Federal Republic of Germany Pat. 2,346,380. Of course, a motor in accordance with the invention can in the same fashion be constructed as an internal-rotor motor or even as a flat motor (with planar air gap). In the case of the illustrated cylindrical air gap, the air gap shape depends upon what reluctance torque waveform one desires, and depends upon the type of magnetization of rotor 61. The pole gaps 64 and 65 can with advantage be inclined.

During operation, there flows in the winding 75, alternately, a d.c. current pulse from terminal 78 to terminal 79, and then a d.c. current pulse from terminal 79 to terminal 78. Between each two successively occurring pulses there occurs a respective current gap. The latter can be produced, e.g., in correspondence to Federal Republic of Germany Pat. 3,044,056, particularly with the arrangements of FIG. 4 or 6 of this German patent; the latter is incorporated herein by reference to avoid lengthiness.

As FIG. 4 shows, the motor winding 75 is part of a full bridge circuit 90 that includes two pnp power transistors 91, 92 and two npn power transistors 93, 94. The emitters of the transistors 91 and 92 are connected to the plus line 12, and the emitters of the transistors 93 and 94 are connected to the minus line 16. The collectors of transistors 91 and 93 are connected to each other and to the winding terminal 78. In the same way, the collectors of the transistors 92 and 94 are connected to each other and to the winding terminal 79. Two free-running or fly-back diodes 95, 96 are connected antiparallel to the power transistors 91 and 92 and protect the latter against too high voltage spikes occurring during switching operations. The bases of the transistors 91 and 92 are each connected via a respective capacitor 101, 102 to the plus line 12. In the event that low operating voltages are used, the transistors 91–94 are simple transistors; in the event that high operating voltages are used, they are—as depicted—Darlington transistors.

Two npn-transistors 106, 107 serve to control the bridge circuit 90. The collector of 106 is via a resistor 108 connected to the base of 92, and the collector of 107 via a resistor 109 to the base of 91. The emitter of 106 is connected to the base of 93, and the emitter of 107 is connected to the base of 94. Thus, if the transistor 106 is rendered conductive, the two diagonally opposite power transistors 92 and 93 become conductive, and a current $i_1$ flows in the direction from terminal 79 to terminal 78 through the winding 75. If, in the opposite situation, the transistor 107 is rendered conductive, then the diagonally opposite transistors 91 and 94 are rendered conductive, and a current $i_2$ flows in the direction from terminal 78 to terminal 79.

Two npn transistors 112 and 113 are furthermore provided, as adjuster elements for a current-limiting arrangement 110, each being connected at its emitter to the minus line 16. The collector of 112 is connected to the base of 93, and the collector of 113 to the base of 94. The base of transistor 112 and the base of transistor 113 are connected, each via a respective resistor 114 or 115, to the output 37 of the current-limiting arrangement 110. Thus, if the latter renders the two transistors 112 and 113 conductive, then the bases of the power transistors 93 and 94 cease to receive current, and these two transistors become non-conductive, so that the winding 75 is separated from the minus line 16 and can receive no further current therefrom. In this event the power transistors 91 and 92, in contrast, can be rendered conductive exactly as before. This is advantageous because the current drop in the winding 75 becomes less steep and smaller voltage spikes develop across the winding 75. As a result, the motor 60 runs more quietly and more uniformly, the power transistors 91–94 are less stressed, and the iron losses in the motor 60 become smaller. Furthermore, smaller current fluctuations are produced on the feed lines to the motor, this being aided by the capacitor 18.

The conduction states of its control transistors 106 and 107 are controlled via control lines 116, 117 from a commutation control stage 120 for the motor. The control stage 120 contains a commutation control device 118, also called a selector circuit, and the latter receives its control pulses from the Hall-IC 82 (FIG. 2), which latter, as shown, is connected just like the control device 118 to the regulated voltage between the lines 26 and 21. As schematically illustrated in FIG. 3, the rectangular pulses 116′ (FIG. 3A) and 117′ (FIG. 3B) on the control lines 116, 117 alternate with each other and are separated from each other by inter-pulse gaps so that, in an always alternating fashion, the power transistors 91 and 94, and then the power transistors 92 and 93, are rendered conductive, but never all four transistors 91–94 simultaneously because, if they were, these would be immediately destroyed by the resulting short-circuit.

The bridge circuit 90 contains still further components; in particular, a resistor 123 is provided between the bases of transistors 106 and 93, and likewise a resistor 124 between the bases of transistors 107 and 94. A capacitor 125 is arranged between the emitters of transistors 106 and 93, and likewise a capacitor 126 between the emitters of transistors 107 and 94. These capacitors serve to avoid undesired current spikes during switching of the transistors 91, 92. The capacitors 101, 102 fulfill the same function for the transistors 93 and 94.

The current-limiting arrangement 110 is constructed to a great extent in the same way as the current-limiting arrangement 27 of FIG. 1, for which reason the same reference numerals are used as there. However, in FIG. 4 a double comparator is employed which contains, in addition to the operational amplifier 30 a further operational amplifier 130, the latter likewise being so constructed that its output 131 is internally connected to the line 21 so long as its non-inverting input "+" is at a potential more negative than that at its inverting input "−". In the opposite situation, the output 131 is no longer connected to the line 21 (so-called open-collector circuit). The amplifier 130 is supplied with operating current jointly with the amplifier 30, for which reason its current supply is not separately indicated. The resistor 35 in FIG. 4 is thus located between the output 131 and the junction 31, and is caused by the operational amplifier 130 to become connected in parallel to resistor 33 when the non-inverting input "+" is at a potential more negative than that at the inverting input "−", whereas in the opposite situation it is not connected in parallel to the resistor 33.

In FIG. 4 the resistor 32 of FIG. 1 is subdivided into two series-connected resistors 32′ and 32″, whose junction 132 is connected to the non-inverting input "+" of operational amplifier 130. In contrast, the inverting input "−" of amplifier 130 is connected to the output 37 of amplifier 30, so that amplifier 130 always performs switching operations opposite to those of the amplifier 30, and thus changes state in synchronism with the same. If e.g. the motor 60 is running at rated rpm and its current is below the threshold value of the current-limiting arrangement 110, then the output 37 of amplifier 30 is connected to line 21, so that transistors 112 and 113 do not conduct and the bridge circuit 90 in normal fashion can be controlled by the pulses 116′, 117′ on the respective lines 116, 117. In this situation the output 131 of amplifier 130 is not connected to the line 21, so that resistor 35 is not connected in parallel to resistor 33 and the threshold value of current-limiting arrangement 110 is high.

In contrast, upon start-up the amplifier 30 changes state with a higher frequency, so that, depending upon the circumstances, it switches the transistors 112 and 113 OFF and ON several thousand times per second and thereby each time interrupts the application of current to the winding 75, in order to prevent the current from rising to above the threshold value. During each of these interruptions of current the amplifier 130 connects resistor 35 in parallel to resistor 33, so that the threshold value of the current-limiting arrangement 110 will be correspondingly decreased and a correspondingly lower current will flow in the winding 75, as a result of which the power consumed by the motor 60 is limited to, e.g., one quarter the power at rated rpm, as described for FIG. 1.

The values for the components of FIG. 4 correspond to those given for FIG. 1. For the two operational amplifiers 30 and 130 e.g. the double comparator LM 393 can be employed, which contains two such amplifiers, so that all in all there results a very small space requirement for the circuit, such as is especially important for device fans.

If the circuit of FIG. 4 is to be used with a bifilar motor, then e.g. the winding 75 would be eliminated and, in place of the same, one winding conductor would be provided replacing the transistor 91 and a second winding conductor would be provided replacing the transistor 92, in which case the resistors 108 and 109 would each have to be directly connected to line 12. Likewise one can of course use the current-limiting arrangement in the same way to correspondingly control two full bridge circuits, in which case in the second full bridge circuit the transistors that correspond to transistors 112 and 113 would likewise have to be connected via resistors to the output 37. Such modifications, and other ones, are of course within the scope of the present invention. The invention is particularly suited for the drive of so-called device fans, because it prevents overheating of the fan's motor in the event that the latter is blocked against rotation, which in practice happens not seldom. Even a combination with an rpm regulator is possible, e.g. in the manner described in DE-OS 3,044,027.

Thus an important concept of the invention is to be seen in the following aspect: information concerning what the motor rpm is at any particular time, is embodied in the duty factor of the employed current-limiting arrangement, and is used for setting the upper (and possibly also the lower) threshold value for this current-limiting arrangement, in order in that fashion to be able to limit the motor current to lower values at low rpm's and at zero rpm, but without hindering operation at rated rpm. By means of the invention one manages to accomplish this with extraordinarily simple means and very low additional cost, and the invention is suited for all motor types in which the back-EMF is a function of motor rpm.

The invention is not limited to arrangements with time-delay amplifiers that detect only the exceeding of an upper threshold value for the current, but rather is in the same way suitable for so-called two-point regulators that switch the current off when an upper limit value is exceeded, and then switch the current back on again in reaction to a decrease to below a lower limit value, namely after a time elapse. With these motors, too, the duty factor is a function of the back-EMF, and thus of rpm, for which reason the invention is applicable in the same way.

The repetition frequency of a time-delay amplifier, for the situation in which the motor is blocked against rotation, can be predetermined by the designer, by selecting the parameters for the time-delay amplifier and, usually, is limited to a few kHz, since the motor in such situation acts like a choke and too high iron losses would develop at too high frequencies. Typical for the blocked situation is a ratio of current pulse duration to inter-pulse duration in the range between 1:4 and 1:6.

Figure 5:
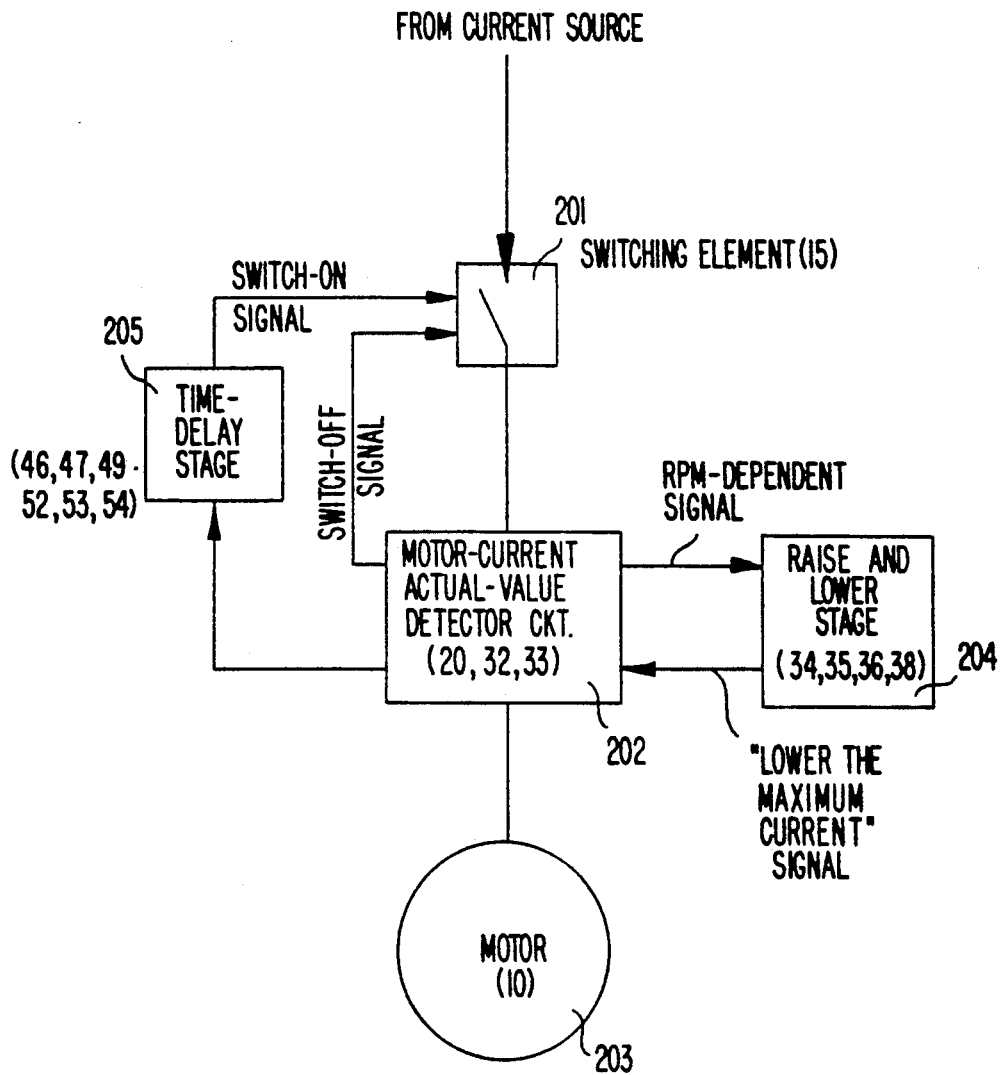
FIG. 5 is a schematic block diagram that illustrates the concepts of the disclosed circuit arrangements for controlling a d.c. motor.

FIG. 5 is a schematic block diagram of an inventive circuit arrangement for the control of a d.c. motor. The reference numerals appearing in parentheses are taken from FIG. 1 and are intended merely to facilitate comparison of the schematic block diagram with a detailed exemplary embodiment.

The motor current, furnished by a non-illustrated current source, travels via a switching element (201) to a circuit (202) that detects the actual value of motor current, and from there travels to the d.c. motor (203). Inside the circuit (202) that detects the actual value of motor current, there occurs a monitoring of whether the back-EMF-dependent motor current is exceeding a predetermined maximum value (the back-EMF being motor-rpm-dependent, as described in greater detail in FIGS. 1-4). If the predetermined maximum value is being exceeded, especially in the situation where the motor is blocked against rotation or during start-up of the motor, then the circuit (202) transmits a switch-OFF signal to the switching element (201), whereupon the motor current becomes interrupted. Simultaneously, an (rpm-dependent) signal is transmitted to a raise-and-lower stage (204) designed to average, from a plurality of such signals, the motor-energization ON/OFF-ratio, and to do so with a time-constant that is relatively long compared to the pulse-duration exhibited by the motor energization. In addition to all this, a time-delay stage (205) becomes activated and, after elapse of a time delay, transmits a switch-ON signal to the switching element (201), to again connect the motor (203) to the current source. In dependence upon the time-constant of the raise-and-lower stage (204), this sequence of events repeats itself during the course of a plurality of motor-energization ON/OFF periods and leads, finally, to transmission of a "lower the maximum current" signal to the motor-current actual-value detector circuit (202), in which latter the monitored, upper limit value for motor current is thereupon lowered.

As already described with respect to FIGS. 1-4, there occurs in this way, and using simple means, a reduction of motor current whenever the motor has not yet reached its rated rpm or indeed is blocked against rotation.

Figure 6:
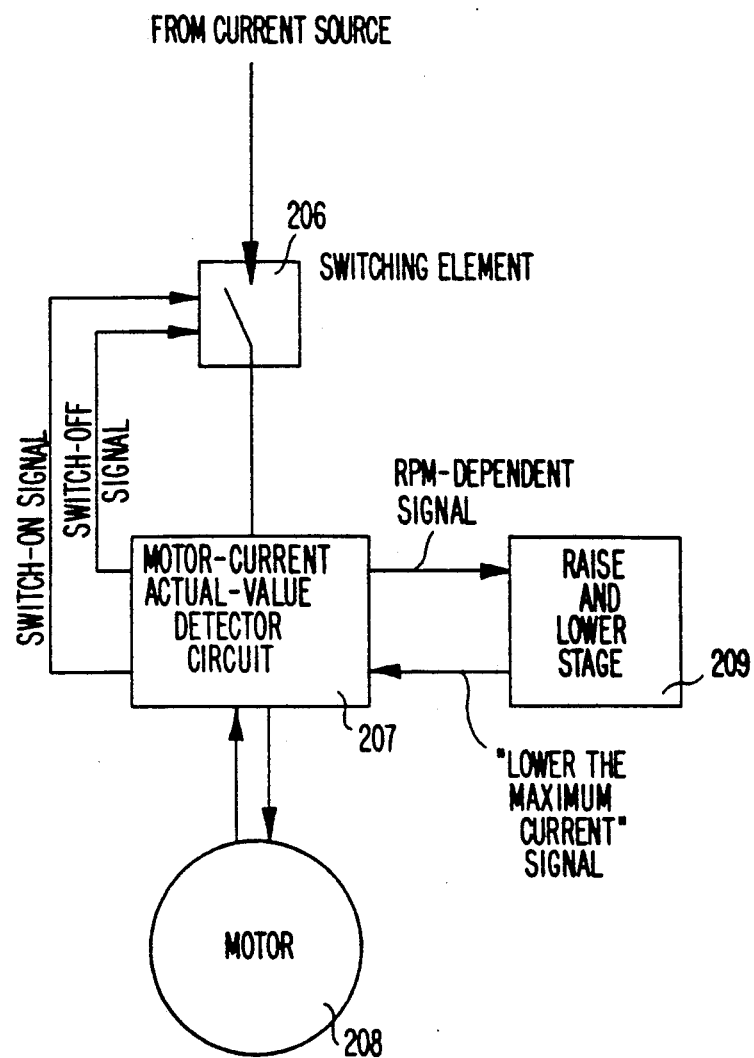
FIG. 6 depicts a schematic block diagram that is a variant of that of FIG. 5.

FIG. 6 depicts a schematic block diagram of a variant of FIG. 5, such that one can dispense with the FIG. 5 time-delay stage. Here too, the motor current is fed to the motor (208) through the intermediary of a switching element (206) and a motor-current actual-value detector circuit (207). In contradistinction to FIG. 5, however, the motor-current actual-value detector circuit (207) is designed to be capable of detecting both a predetermined maximum current and also a likewise predetermined minimum current. Here again, if the motor current exceeds the predetermined maximum value, a switch-OFF signal is transmitted to the switching element (206), whereupon the supply of current becomes interrupted. Next, the motor-current actual-value detector circuit (207) determines, from the oscillatory decay of the current in motor (208), when the predetermined lower limit value is no longer being exceeded or reached. As soon as it has been determined that the lower limit value is not being exceeded or reached, the motor-current actual-value detector circuit (207) transmits a switch-ON signal to the switching element (206), whereupon the motor becomes again connected to the current source. Thus, here likewise, the motor current, after being switched OFF, is switched ON again, after a time elapse.

The raise-and-lower stage (209) operates here in the manner described with regard to FIG. 5.

I claim:

1. A circuit for controlling a current to an electric motor, comprising:

a current path through which current is supplied to the motor;

a switching element connected in the current path to interrupt the path;

an element serially connected with the switching element in the current path to sense current in the current path;

means connected to the serially-connected element for deriving a signal indicative of speed of the motor; and means for repeatedly switching the switching element whenever a sensed current is greater than a selected maximum current for the motor to provide that the average current in the motor over several switching cycles is less than the selected maximum current and that the selected maximum current varies in relationship with the signal indicative of motor speed to provide a first selected maximum current at a relatively low motor speed and a second selected maximum current greater than said first maximum current as the motor speed increases with respect to said relatively low motor speed.

2. The circuit according to claim 1, further comprising a delay element for timing the switching of the switching element and delaying the re-closing of the current path after interruption and for bypassing the delay element at least partially during interruption of the current.

3. The circuit according to claim 2, wherein said motor is a brushless d.c. electric motor and the circuit further comprises electronic bridge circuit means for commutating the current to the motor.

4. The circuit according to claim 1, wherein the means for repeatedly switching the switching element includes a voltage divider having a division ratio for selecting the selected maximum current for the motor and includes an electronic circuit, responsive to the means for deriving a signal relating to motor speed, for modifying the division ratio to provide a direct relationship of the selected maximum current to the motor speed.

5. The circuit according to claim 4, wherein the electronic circuit for modifying the division ratio connects a controllable conduction path in parallel with a portion of the voltage divider.

6. The circuit according to claim 5, further including means interconnected with the portion of the voltage divider and the controllable conduction path in parallel therewith for reducing voltage changes across that portion of the voltage divider.

7. The circuit according to claim 1, wherein the element serially connected with the switching element in the current path is resistive, the means for deriving a signal indicative of motor speed comprises a predominantly resistive circuit, and the means for repeatedly switching the switching element comprises an amplifying means for comparing the voltage across the resistive, serially-connected element with the voltage across the predominantly resistive circuit to control the switching element to interrupt the current path to reduce the voltage across the resistive, serially-connected element.

8. The circuit according to claim 7, wherein the amplifying means for comparing includes a capacitive feedback circuit to limit the frequency of switching of the switching element.

9. The circuit according to claim 8, wherein the capacitive feedback circuit includes a first diode connected to provide the capacitive feedback circuit with a relatively short time constant for switching the switching element to interrupt the current path and a relatively long time constant for re-closing of the current path after interruption.

10. The circuit according to claim 9, wherein the first diode is connected to reduce series resistance for the capacitive feedback circuit whenever the first diode is forward biased.

11. The circuit according to claim 10, wherein the capacitive feedback circuit includes first and second capacitances connected to a common node to which the first diode is also connected, the second capacitance being smaller than the first capacitance to provide asymmetry of the interruption of the current path a compared to its reclosing, and a second diode connected across the second capacitance.

12. The circuit according to claim 1, wherein said motor is a brushless d.c. electric motor and the circuit includes electronic bridge circuit means for commutating the current to the motor.

13. A circuit for controlling a current to an electric motor, comprising:

a current path through which current is supplied to the motor;

a switching element connected in the current path to interrupt the path;

an element serially connected with the switching element in the current path to sense current in the current path;

means connected to the serially-connected element for deriving a signal indicative of speed of the motor;

means for repeatedly switching the switching element whenever a sensed current is greater than a selected maximum current for the motor to provide that the average current in the motor over several switching cycles is less than the selected maximum current; and means for varying the selected maximum current in relationship with the signal indicative of motor speed to provide a first selected maximum current at a relatively low motor speed and a second selected maximum current greater than said first selected maximum current as the motor speed increases with respect to said relatively low motor speed.

14. The circuit according to claim 13, wherein the means for repeatedly switching includes a voltage divider having a division ratio, and the output section thereof comprises means for modifying the division ratio to provide a direct relationship of the limit value of current to the angular speed or back electromotive force of the motor.

15. The circuit according to claim 13, wherein the means for repeatedly switching comprises amplifying means having a capacitive feedback circuit and means for providing the capacitive feedback circuit with a relatively short time constant for turning off the energization of the motor and a relatively long time constant for turning on energization of the motor.

16. The circuit according to claim 13, wherein the means for varying the selected maximum current in relationship with the signal indicative of motor speed includes a voltage divider having a division ratio for selecting the selected maximum current for the motor and includes an electronic circuit, responsive to the means for deriving a signal relating to motor speed, for modifying the division ratio to provide a direct relationship of the selected maximum current to the motor speed.

17. A circuit for controlling the current of a DC motor to which power is supplied via a connection from a power source, comprising:
- a switching element for repeatedly switching on and off the connection from the power source;
- a current-sensing element for sensing the current flowing through the motor to produce an output signal;
- a voltage divider connected to receive a voltage from the power source and having a portion providing a limit signal setting a limit for the current;
- a comparator comparing the output signal of the current-sensing element with the limit signal from the portion of the voltage divider to switch off the switching element if the output signal is higher than the limit signal; and
- means for changing the limit signal of the voltage divider to be relatively small when the on-to-off ratio of the switching element is relatively small and to be larger when the on-to-off ratio of the switching element is larger.

18. A circuit according to claim 17, wherein the voltage divider comprises a switch and a resistor connected in series with the switch, the switch and the resistor connected in series therewith being connected in parallel with the portion of the voltage divider.

19. A circuit according to claim 18, wherein the voltage divider further includes a capacitor connected in parallel with the portion of the voltage divider.

* * * * *